United States Patent
Evans et al.

(10) Patent No.: US 7,856,404 B2
(45) Date of Patent: Dec. 21, 2010

(54) PLAYLIST BURNING IN RIGHTS-MANAGEMENT CONTEXT

(75) Inventors: Brian P. Evans, Redmond, WA (US); Clifford P. Strom, Sammamish, WA (US); Geoffrey Dunbar, Kirkland, WA (US); Richard D. Prologo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1086 days.

(21) Appl. No.: 11/107,709

(22) Filed: Apr. 14, 2005

(65) Prior Publication Data

US 2006/0235799 A1    Oct. 19, 2006

(51) Int. Cl.
*G06F 21/00* (2006.01)
*H04K 1/00* (2006.01)
*H04L 9/00* (2006.01)

(52) U.S. Cl. .......................................... 705/59; 705/52

(58) Field of Classification Search ............... 705/57–59
See application file for complete search history.

(56) References Cited

U.S. PATENT DOCUMENTS

| | | | |
|---|---|---|---|
| 3,718,906 A | 2/1973 | Lightner | 340/147 R |
| 4,323,921 A | 4/1982 | Guillou | 358/114 |
| 4,528,643 A | 7/1985 | Freeny, Jr. | 364/900 |
| 4,658,093 A | 4/1987 | Hellman | 380/25 |
| 4,683,553 A | 7/1987 | Mollier | 380/4 |
| 4,827,508 A | 5/1989 | Shear | 380/4 |
| 4,916,738 A | 4/1990 | Chandra et al. | 380/25 |
| 4,926,479 A | 5/1990 | Goldwasser et al. | 380/23 |
| 4,953,209 A | 8/1990 | Ryder, Sr. et al. | 380/23 |
| 4,977,594 A | 12/1990 | Shear | 380/4 |
| 5,050,213 A | 9/1991 | Shear | 380/25 |
| 5,103,392 A | 4/1992 | Mori | 395/725 |
| 5,103,476 A | 4/1992 | Waite et al. | 380/4 |
| 5,109,413 A | 4/1992 | Comerford et al. | 380/4 |
| 5,117,457 A | 5/1992 | Comerford et al. | 380/3 |
| 5,193,573 A | 3/1993 | Chronister | 137/315 |
| 5,222,134 A | 6/1993 | Waite et al. | 380/4 |
| 5,261,002 A | 11/1993 | Perlman et al. | 380/30 |
| 5,319,705 A | 6/1994 | Halter et al. | 380/4 |
| 5,410,598 A | 4/1995 | Shear | 380/4 |
| 5,473,692 A | 12/1995 | Davis | 380/25 |

(Continued)

FOREIGN PATENT DOCUMENTS

EP    0 715 246 B1    6/1996

(Continued)

OTHER PUBLICATIONS

"Aladdin Knowledge Systems Partners with Rights Exchange, Inc. to Develop a Comprehensive Solution for Electronic Software Distribution," Aug. 3, 1988, 5 pages.

(Continued)

*Primary Examiner*—Andrew J. Fischer
*Assistant Examiner*—C. Aaron McIntyre
(74) *Attorney, Agent, or Firm*—Woodcock Washburn LLP

(57) ABSTRACT

A method is provided for a computing device to copy (burn) a playlist of tracks to a portable medium, where each track corresponds to a piece of digital content. At least one of the pieces of content is rights-management (RM) protected and accordingly is burned to the portable medium only in accordance with a corresponding digital license.

19 Claims, 5 Drawing Sheets

U.S. PATENT DOCUMENTS

| | | | |
|---|---|---|---|
| 5,490,216 A | 2/1996 | Richardson, III | 380/4 |
| 5,509,070 A | 4/1996 | Schull | 380/4 |
| 5,629,980 A | 5/1997 | Stefik et al. | 380/4 |
| 5,634,012 A | 5/1997 | Stefik et al. | 395/239 |
| 5,638,443 A | 6/1997 | Stefik et al. | 380/4 |
| 5,673,316 A | 9/1997 | Auerbach et al. | 380/4 |
| 5,710,887 A | 1/1998 | Chelliah et al. | 395/226 |
| 5,715,403 A | 2/1998 | Stefik | 395/244 |
| 5,765,152 A | 6/1998 | Erickson | 707/9 |
| 5,809,144 A | 9/1998 | Sirbu et al. | 380/25 |
| 5,845,281 A | 12/1998 | Benson et al. | 707/9 |
| 5,892,900 A | 4/1999 | Ginter et al. | 395/186 |
| 5,917,912 A | 6/1999 | Ginter et al. | 380/24 |
| 5,953,420 A | 9/1999 | Matyas, Jr. et al. | 380/21 |
| 6,073,124 A | 6/2000 | Krishnan et al. | 705/59 |
| 6,078,909 A | 6/2000 | Knutson | 705/59 |
| 6,094,487 A | 7/2000 | Butler et al. | 380/270 |
| 6,189,146 B1 | 2/2001 | Misra et al. | 717/11 |
| 6,219,652 B1 | 4/2001 | Carter et al. | 705/59 |
| 6,226,618 B1 | 5/2001 | Downs et al. | 705/1 |
| 6,233,567 B1 | 5/2001 | Cohen | 705/59 |
| 6,289,452 B1 | 9/2001 | Arnold et al. | 713/175 |
| 6,330,670 B1 | 12/2001 | England et al. | 713/2 |
| 6,343,280 B2 | 1/2002 | Clark | 705/55 |
| 6,574,609 B1 | 6/2003 | Downs et al. | 705/50 |
| 6,574,612 B1 | 6/2003 | Baratti et al. | 705/59 |
| 6,681,017 B1 | 1/2004 | Matias et al. | 380/277 |
| 6,832,319 B1 | 12/2004 | Bell et al. | 713/193 |
| 2001/0052077 A1 | 12/2001 | Fung et al. | 713/184 |
| 2001/0056539 A1 | 12/2001 | Pavlin et al. | 713/193 |
| 2002/0013772 A1 | 1/2002 | Peinado | 705/51 |
| 2003/0108164 A1* | 6/2003 | Laurin et al. | 379/88.01 |
| 2003/0194094 A1 | 10/2003 | Lampson et al. | 380/282 |
| 2004/0205028 A1* | 10/2004 | Verosub et al. | 705/59 |

FOREIGN PATENT DOCUMENTS

| | | |
|---|---|---|
| EP | 0 715 247 B1 | 6/1996 |
| WO | WO 93/01550 A1 | 1/1993 |
| WO | WO 96/13013 A1 | 5/1996 |
| WO | WO 96/24092 A3 | 8/1996 |
| WO | WO 96/27155 A2 | 9/1996 |
| WO | WO 97/25798 A1 | 7/1997 |
| WO | WO 97/43761 A2 | 11/1997 |
| WO | WO 98/09209 A1 | 3/1998 |
| WO | WO 98/10381 A1 | 3/1998 |
| WO | WO 98/21679 A1 | 5/1998 |
| WO | WO 98/24037 A1 | 6/1998 |
| WO | WO 98/37481 A1 | 8/1998 |
| WO | WO 00/15221 A1 | 3/2000 |
| WO | WO 00/58811 A3 | 10/2000 |
| WO | WO 00/59150 A2 | 10/2000 |

OTHER PUBLICATIONS

Armati, D., "Tools and standards for protection, control and presentation of data," Apr. 3, 1996, 17 pages.

Benjamin, R. et al., "Electronic markets and virtual value chains on the information superhighway," *Sloan Management Rev.*, Winter, 1995, 62-72.

Cassidy, "A Web developers guide to content encapsulation technology," Apr. 1997, 5 pages.

Cox, B., "Superdistribution," *Idees Fortes*, Sep. 1994, 2 pages.

Cox, B., "What if There Is A Silver Bullet," *J. Object Oriented Programm.*, Jun. 1992, 8-9 and 76.

Griswold, G.N., "A Method for Protecting Copyright on Networks," *IMA Intell. Property Project Proceedings*, Jan. 1994, 1(1), 169-178.

Hauser, R.C., "Does licensing require new access control techniques?" Aug. 1993, 9 pages.

Hudgins-Bonafield, C. "Selling Knowledge on the Net," *Network Computing*, Jun. 1, 1995, 102-109.

"IBM spearheading intellectual property protection technology for information on the Internet," May 1996, 3 pages.

"Technological Solutions Rise to Complement Law's Small Stick Guarding Electronic Works," *Information Law Alert*, Jun. 16, 1995, 3-4 and 7.

Kaplan, M.A., "IBM Cryptolopes_, Super-Distribution and Digital Rights Management," Dec. 1996, 7 pages.

Kent, S.T., "Protecting externally supplied software in small computers," Sep. 1980, 1-42 and 250-252.

Kohl, U. et al., "Safeguarding Digital Library Contents and Users; Protecting Documents Rather Than Channels," *D-Lib Magazine*, Sep. 1997, 9 pages.

Linn, R.J., "Copyright and Information Services in the Context of the National Research and Education Network," *IMA Intell. Property Project Proceedings*, Jan. 1994, 1(1), 1 and 10-20.

McNab, L., "Super-distribution works better in practical applications," Mar. 2, 1998, 2 pages.

Moeller, M., "NetTrust lets Cyberspace Merchants Take Account," *PC Week*, Nov. 20, 1995, 12(48), 1 page.

Moeller, M., "IBM takes charge of E-commerce; Plans client, server apps based on SET," Apr. 1996, 4 pages.

Pemberton, J., "An ONLINE Interview with Jeff Crigler at IBM InfoMarket," Jul. 1996, 6 pages.

"LicensIt: kinder, gentler copyright? Copyright management system links content, authorship information," *Seybold Report on Desktop Publishing*, 1996, 10(11), 2 pages.

Sibert, O. et al., "The DigiBox: A Self-protecting Container for Information Commerce," *First USENIX Workshop on Electronic Commerce*, Jul. 11-12, 1995, 171-183.

Sibert, O. et al., "Securing the Content, Not the Wire, for Information Commerce," Jul. 1995, 1-11.

Stefik, M., "Trusted Systems," Mar. 1997, 8 pages.

Stefik, M., "Shifting the Possible: How Trusted Systems and Digital Property Rights Challenge Us to Rethink Digital Publishing," *Technical Perspective*, 1997, 137-159.

"Rights Management in the Digital Age: Trading in Bits, Not Atoms," Spring, 1997, 4, 3 pages.

Weber, R., "Digital Right Management Technology," Oct. 1995, 35 pages.

White, S.R. et al., "Abyss: An Architecture for Software Protection," *IEEE Trans. On Software Engineering*, Jun. 1990, 16(6), 619-629.

White, S.R. et al., "Abyss: A trusted architecture for software protection," *IEEE Symposium on Security and Privacy*, Apr. 27-29, 1987, 38-51.

Ramanujapuram, A. et al., "Digital Content & Intellectual Property Rights: A specification language and tools for rights management," Dec. 1998, 20-23 and 26.

Unknown, Optimising license checkouts from a floating license server, *ARM the Architecture for the Digital World*, http://www.arm.com/support/faqdev/1391.html.

Thompson, C.W., et al., "Digital licensing," *IEEE Internet Computing*, 2005, 9(4).

Olson, M., et al., "Concurrent access licensing," *UNIX Review*, 1988, 6(9), 67-72 (from Dialog Accession No. 01254918).

Unknown, Finland—Data fellows secures ICSA certification, *Newsbytes*, 1998, (from DialogClassic Web(TM), File 9, Accession No. 01451058, 2 pages).

Unknown, "Black box crypton defies the hackers," *Electronic Weekly*, 1985, 1257, p. 26 (from DialogClassic Web™ file 275, Accession No. 01116377).

Unknown, "Solution for piracy," *Which Computer*, 1983, p. 29 (from DialogClassic Web™ file 275, Accession No. 01014280).

From PR Newswire, "Sony develops copyright protection solutions for digital music content," 1999, http://www.findarticles.com.

From http://www.findarticles.com, "BreakerTech joins copyright management market," *Computer International*, 1999.

Kahn, R.E, "Deposit, Registration and Recordation in an electronic copyright management system," *IMA Intellectual Property Project Proceedings*, 1994, 1(1), 111-120.

"Aladdin acquires the assets of Micro Macro Technologies," *Business Wire*, 1999 http://www.findarticles.com.

* cited by examiner

| EVENT | LID - TRACK BURNS AVAIL. | TID - MAX PLAYLIST BURN COUNT | TID / PID - TRACK-PLAYLIST BURNED |
|---|---|---|---|
| [FIRST] LICENSE STORED | 10 | 5 | |
| BURN 1 - SUCCESS | 9 | 5 | 1 |
| BURN 2 - SUCCESS | 8 | 5 | 2 |
| BURN 3 - SUCCESS | 7 | 5 | 3 |
| BURN 4 - SUCCESS | 6 | 5 | 4 |
| BURN 5 - SUCCESS | 5 | 5 | 5 |
| BURN 6 - FAIL | 5 | 5 | 5 |
| [SECOND] LICENSE STORED | 5 | 9 | 5 |
| BURN 6 - SUCCESS | 4 | 9 | 6 |

FIG. 5

PLAYLIST BURNING IN RIGHTS-MANAGEMENT CONTEXT

TECHNICAL FIELD

The present invention relates to an architecture for enforcing rights in digital content. More specifically, the present invention relates to such an enforcement architecture that allows a plurality of pieces of digital content or 'playlist' to be copied or 'burned' to a portable medium such as an optical disk. Even more specifically, the present invention relates to such an architecture that allows such a playlist to be burned to such a portable medium in accordance with rights set forth in digital licenses corresponding to the pieces of digital content.

BACKGROUND OF THE INVENTION

As is known, and referring now to FIG. 1, a rights management (RM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14, a portable playback device or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. An RM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based RM system 10 allows an owner of digital content 12 to specify rules that must be satisfied before such digital content 12 is allowed to be rendered. Such rules can include the aforementioned requirements and/or others, and may be embodied within a digital license 16 that the user/user's computing device 14 (hereinafter, such terms are interchangeable unless circumstances require otherwise) must obtain from the content owner or an agent thereof, or such rules may already be attached to the content 12. Such license 16 may for example include the decryption key (KD) for decrypting the digital content 12, perhaps encrypted according to another key decryptable by the user's computing device or other playback device.

The content owner for a piece of digital content 12 would prefer not to distribute the content 12 to the user unless such owner can trust that the user will abide by the rules specified by such content owner in the license 16 or elsewhere. Preferably, then, the user's computing device 14 or other playback device is provided with a trusted component or mechanism 18 that will not render the digital content 12 except according to such rules.

The trusted component 18 typically has an evaluator 20 that reviews the rules, and determines based on the reviewed rules whether the requesting user has the right to render the requested digital content 12 in the manner sought, among other things. As should be understood, the evaluator 20 is trusted in the DRM system 10 to carry out the wishes of the owner of the digital content 12 according to the rules, and the user should not be able to easily alter such trusted component 18 and/or the evaluator 20 for any purpose, nefarious or otherwise.

As should be understood, the rules for rendering the content 12 can specify whether the user has rights to so render based on any of several factors, including who the user is, where the user is located, what type of computing device 14 or other playback device the user is using, what rendering application is calling the RM system 10, the date, the time, etc. In addition, the rules may limit rendering to a pre-determined number of plays, or pre-determined play time, for example.

The rules may be specified according to any appropriate language and syntax. For example, the, language may simply specify attributes and values that must be satisfied (DATE must be later than X, e.g.), or may require the performance of functions according to a specified script (IF DATE greater than X, THEN DO . . . , e.g.).

Upon the evaluator 20 determining that the user satisfies the rules, the digital content 12 can then be rendered. In particular, to render the content 12, the decryption key (KD) is obtained from a pre-defined source and is applied to (KD (CONTENT)) from the content package 13 to result in the actual content 12, and the actual content 12 is then in fact rendered.

In an RM system 10, content 12 is packaged for use by a user by encrypting such content 12 and associating a set of rules with the content 12, whereby the content 12 can be rendered only in accordance with the rules. Because the content 12 can only be rendered in accordance with the rules, then, the content 12 may be freely distributed. Significantly, the content 12, the rules, and an encrypted version of the decryption key (KD) must be communicated to the computing device 14 or other playback device. Moreover, in preparing at least the encrypted version of the decryption key (KD), it is useful to tie the decryption key (KD) and by extension the license 16 containing such decryption key (KD) to the computing device 14 in such a manner that the encrypted decryption key (KD) cannot be accessed to decrypt and render the content 12 except by such computing device. Thus, the content 12, the rules, and the encrypted version of the decryption key (KD) cannot be redistributed in a manner so that the content 12 can be rendered widely and in contravention to the wishes of the content owner.

As may be appreciated, and as seen in FIG. 1, the encrypted decryption key (KD) and by extension the license 16 containing such decryption key (KD) are in fact tied to the computing device 14 by such decryption key (KD) being encrypted according to a public key (PU-BB) of the computing device 14 to result in (PU-BB(KD)). Presumptively, only the computing device 14 is in possession of the private key (PR-BB) corresponding to (PU-BB), and accordingly only such computing device 14 can apply (PR-BB) to (PU-BB(KD)) to reveal (KD).

In at least some instances, despite the content 12 being protected according to the RM system 10 and in the manner set forth above, the owner or distributor of such content 12 nevertheless has agreed to allow the content 12 to be copied or 'burned' in an unencrypted form to a portable medium 24 such as an optical disk or the like. Although allowing such burning of such unencrypted content 12 may seem to be in contravention of the purposes of the RM system 10, it is to be appreciated that there are nevertheless commercial and practical reasons for doing so, chief among them being consumer demand for such a feature. As should be appreciated, such a burn of the unencrypted form of the content 12 typically takes place along with a burn of a number of other pieces of unencrypted content 12, where each such piece of content 12 is a 'track' within. a 'playlist' representing all the pieces of content 12.

Although the owner or distributor of a piece of content 12 has agreed to allow the content 12 to be burned as a track in a playlist, the owner or distributor nevertheless may wish to impose restrictions on the ability to so burn. Most prominently, the owner or distributor may wish to limit the number of times a playlist with the content/track 12 can be burned. Accordingly, in a license 16 corresponding to the track 12, the content owner or distributor may impose a maximum playlist burn value specifying the maximum number of times a particular playlist with the track 12 can in fact be burned.

Note, though, that an issue arises when each track 12 is burned on a track-by-track basis. In particular, when in fact burning on a track-by-track basis, the trusted component 18 of FIG. 1 would be expected, for each RM-protected track 12, to determine based on a corresponding license 16 that the track 12 can in fact be burned as part of the playlist thereof. However, it may occur that after a number of tracks 12 of the playlist are successfully allowed to be burned by the trusted component 18, such trusted component 18 then refuses to allow a particular track 12 to be burned. If so, the burn of the playlist fails, and it may be the case that the portable medium 24 has been wasted, especially if not re-writable. In addition, and presuming the trusted component 18 has already changed one or more stored values corresponding to the licenses 16 of the tracks 12 that have already been burned, such changes to such values are likely not reversible and thus have also been wasted.

Accordingly, a need exists for a method and mechanism by which the tracks 12 of a playlist are burned on a collective basis. In particular, a need exists for a method and mechanism by which the trusted-component 18 determines that all of the RM-protected tracks 12 of the playlist can in fact be burned according to respective licenses 16 thereof prior to in fact burning any of such tracks 12. Also, a need exists for a method and mechanism by which the trusted component 18 does not in fact commit changes to values associated with the burn of the playlist until such trusted component 18 determines that all of the RM-protected tracks 12 of the playlist can in fact be burned.

SUMMARY OF THE INVENTION

The aforementioned needs are satisfied at least in part by the present invention in which a method is provided for a computing device to copy (burn) a playlist of tracks to a portable medium, each track corresponding to a piece of digital content. At least one of the pieces of content is rights-management (RM) protected and accordingly is burned to the portable medium only in accordance with a corresponding digital license.

In the method, the playlist is constructed to include an identification of each track therein. For each track corresponding to a piece of RM-protected content, then, the following actions are performed.

Preliminarily, a license corresponding to the track is retrieved, where the license includes a maximum track burn value and a maximum playlist burn value. The maximum track burn value in the license sets forth a maximum number of times the license may be employed to burn the piece of content as a track to a portable medium, and the maximum playlist burn value sets forth a maximum number of times the license may be employed to burn the corresponding piece of content as a track within a particular playlist. In addition, state information is retrieved from a state store of the computing device including:

- a track burns available count regarding how many track burns are left based on the license;
- a maximum playlist burn count regarding how many track burns per playlist are available based on all available licenses for the track; and
- a track-playlist burned count regarding how many times the track has been burned with regard to the playlist.

A determination is made of whether the track burns available count is zero, and if so, a no-burn action is performed. If not, a further determination is made of whether the track-playlist burned count is less than the maximum playlist burn count. If not, the no-burn action is performed, and if so, the process continues, until all tracks of the playlist corresponding to a piece of RM-protected content have been processed.

After all tracks of the playlist corresponding to a piece of RM-protected content have been processed, a determination is made of whether the no-burn action has been performed. If not, each track of the playlist is burned to the portable medium, and for each track of the playlist corresponding to a piece of RM-protected content, the track burns available count in the state store for the license corresponding to the track is decremented, and the track-playlist burned count in the state store with regard to the track and the playlist is incremented. Thus, such values are accurate and available should the track be again burned as part of the playlist.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 5 is a data diagram showing changes to values stored in a state store of the computing device of FIG. 3 when burning playlists in accordance with one embodiment of the present invention.

DETAILED DESCRIPTION OF THE INVENTION

Computer Environment

Figure 1:
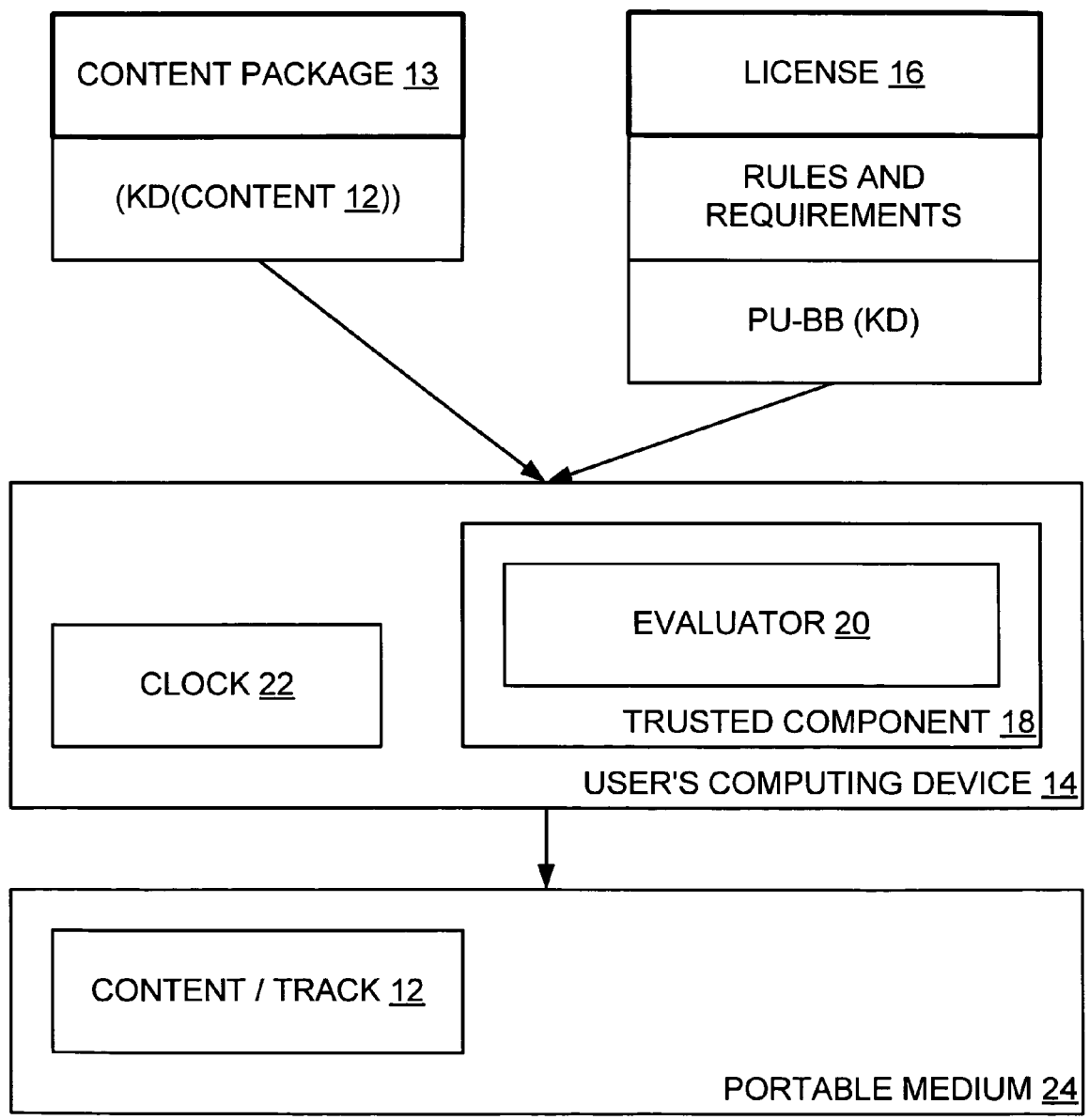
FIG. 1 is a block diagram showing an enforcement architecture of an example of a trust-based system.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Figure 2:
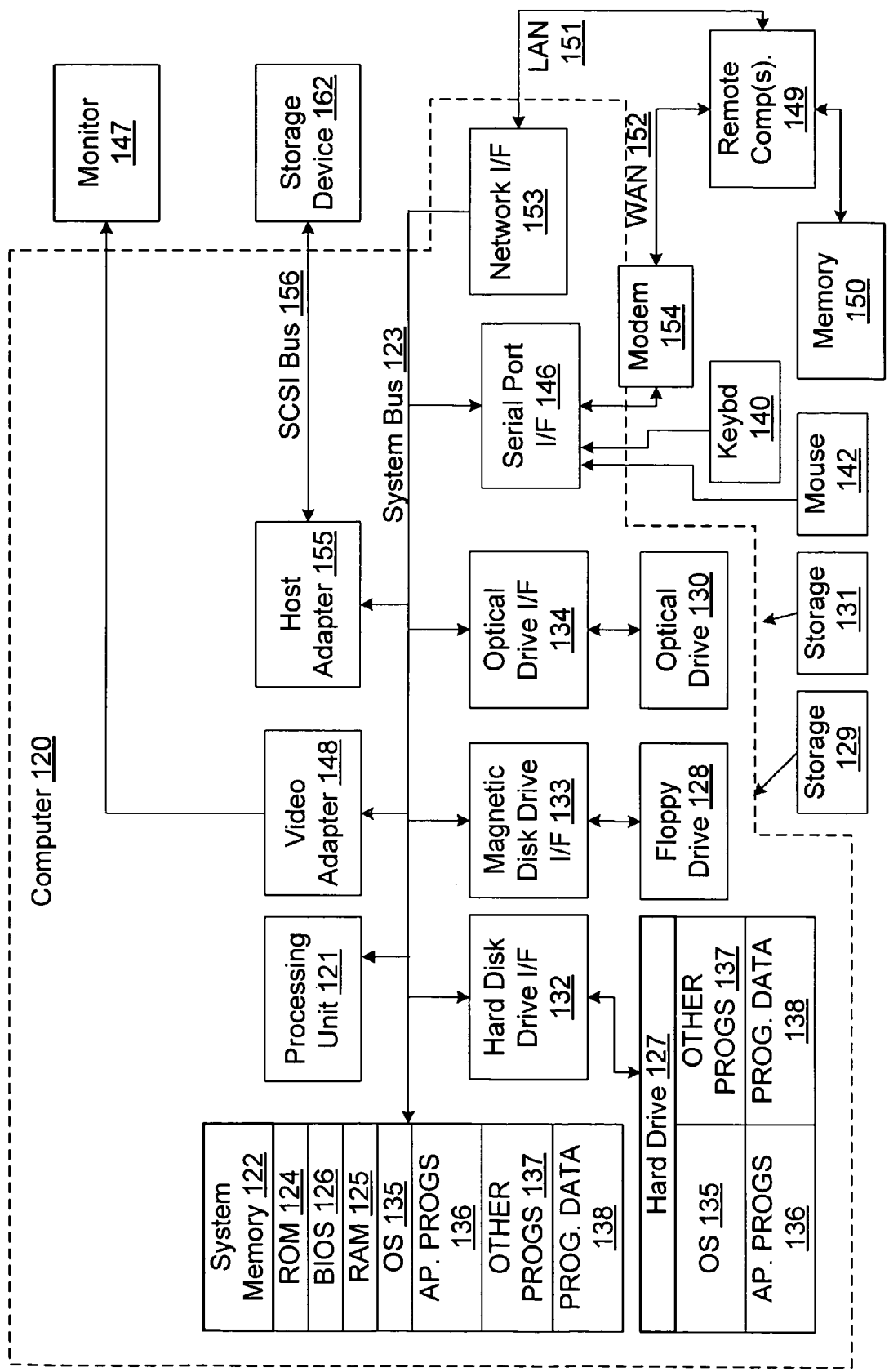
FIG. 2 is a block diagram representing a general purpose computer system in which aspects of the present invention and/or portions thereof may be incorporated.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Playlist Burning in Rights-Management Context

Figure 3:
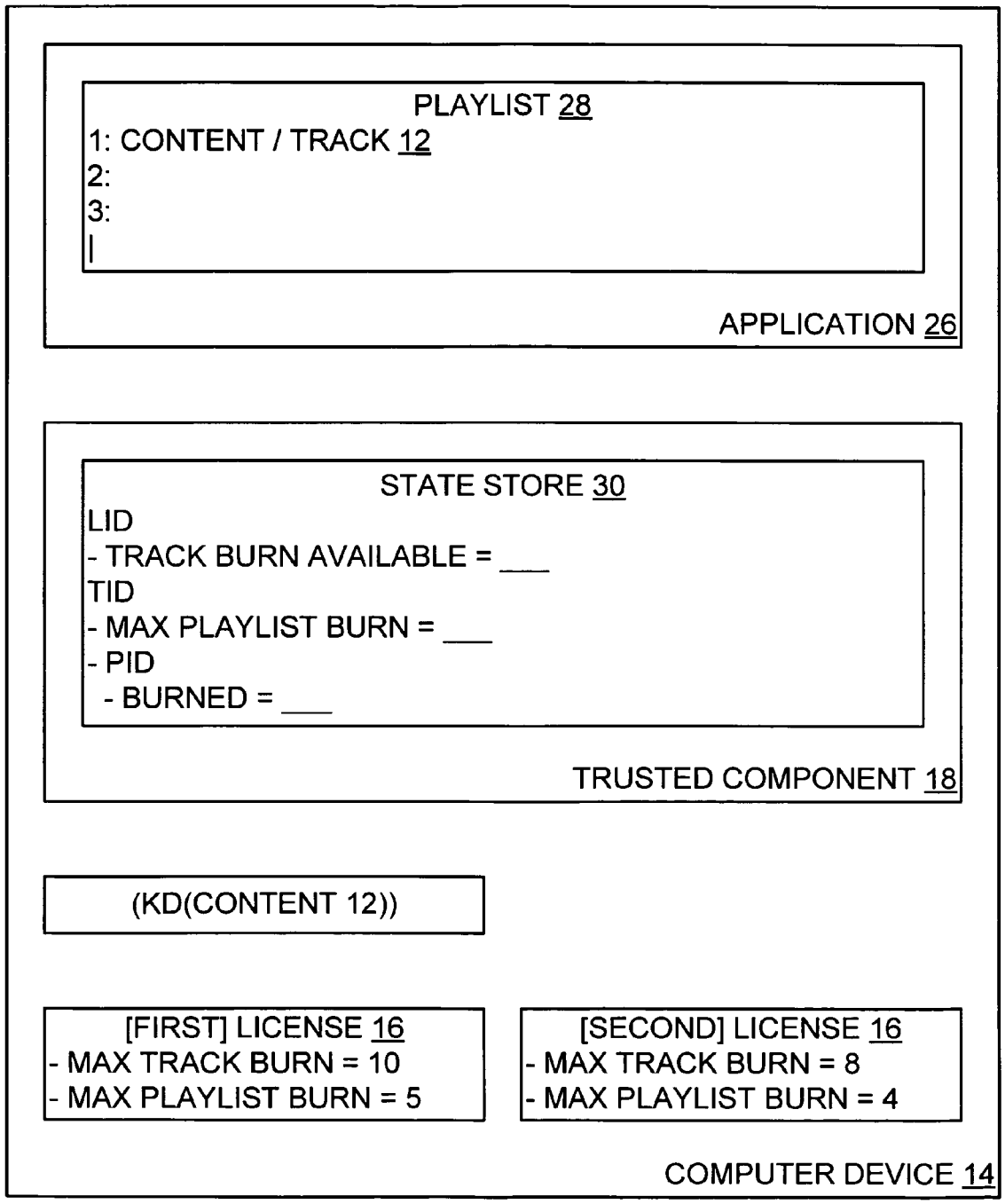
FIG. 3 is a block diagram showing a computing device with a playlist of tracks to be burned to a portable medium in accordance with one embodiment of the present invention.

In one embodiment of the present invention, and turning now to FIG. 3, an application 26 of some sort on the computing device 14 of FIG. 1 wishes to copy or 'burn' RM-protected content 12 in an unencrypted form on a portable medium 24 such as an optical disk or the like. In particular, such application 26 wishes to burn a playlist 28 comprising a plurality of tracks 12, each track 12 corresponding to a piece of content 12 and at least some of the pieces of content 12 being RM-protected.

Figure 4:
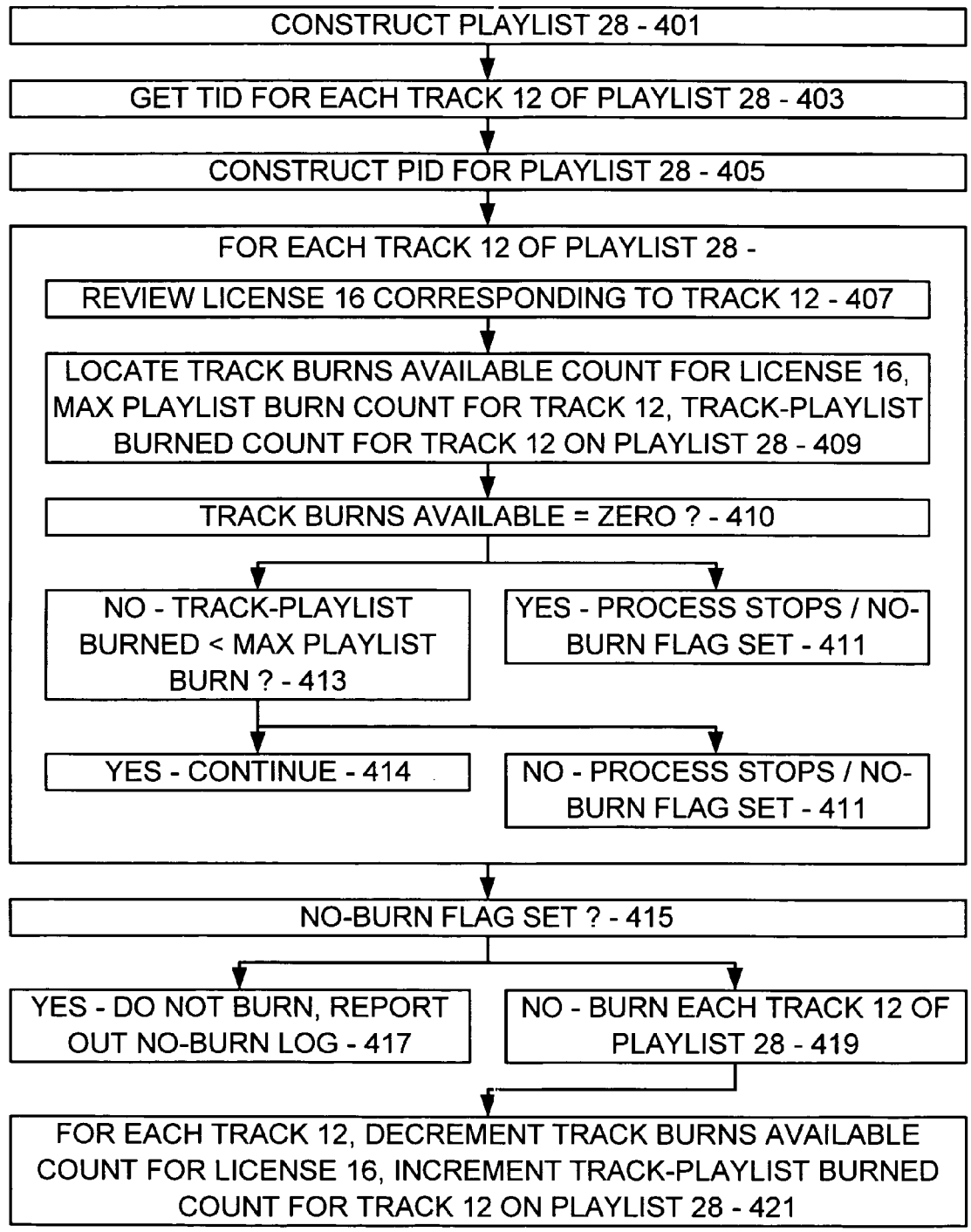
FIG. 4 is a flow diagram showing key steps performed by the computing device of FIG. 3 in burning the playlist in accordance with one embodiment of the present invention.

Accordingly, and as a preliminary matter, and turning now to FIG. 4, the pieces of content 12 that are to constitute the tracks 12 of the playlist 28 are identified to the application 26 (step 401), typically by a user thereof employing an appropriate user interface. Notably, such application 26 may be any appropriate application 26 without departing from the spirit and scope of the present invention, presuming of course that the application 26 can indeed perform the functions set forth herein. Such an application 26 is known or should be apparent to the relevant public and therefore need not be set forth herein in any detail other than that which is set forth below.

At any rate, each piece of content/track 12 has an identification (TID) or is provided with such a TID (step 403), and the application for purposes of the present invention, employs the TIDs of the tracks 12 to form an identification (PID) for the playlist 28 (step 405). For example, it may be that the TIDs of the tracks 12 are concatenated and the concatenated TIDs are then hashed by way of an appropriate hashing algorithm to form the PID for the playlist 28. Note that in order to avoid different PIDs for playlists 28 that differ only in order of tracks 12, it may be advisable to sort the TIDs of the tracks 12 in some reproducible manner prior to concatenation and hashing to form the PID.

Note with regard to the TID for a particular piece of content 12 that such TID may be the property of the packages 13 thereof that associates such content 12 with a particular license 16. For example, the package 13 may include an ID such as a key ID or a license ID that is employed to achieve such association. Note too that with regard to un-protected content 12, it may be necessary to generate a TID therefore by for example performing a hash on such content 12.

For purposes of the present invention, it is to be presumed that for each RM-protected piece of content 12 that is a track 12 on the playlist 28, a corresponding license 16 is available for such piece of content 12, and the license 16 includes at least one of a maximum track burn value and a maximum playlist burn value, if not both. As may be appreciated, the maximum track burn value in the license 16 sets forth a maximum number of times the license 16 may be employed to burn the corresponding piece of content 12 to a portable medium 24, irrespective of considerations involving playlists 28. Similarly, the maximum playlist burn value sets forth a maximum number of times the license 16 may be employed to burn the corresponding piece of content 12 as a track 12 within a particular playlist 28.

In one embodiment of the present invention, then, and with regard to a particular license 16 for a particular piece of content 12 where the particular license 16 sets forth a maximum track burn value and a maximum playlist burn value (the first license 16 of FIG. 3), and as is seen in FIG. 5, the trusted component 18 to which the particular license 16 is tied maintains state information in a state store 30 thereof (FIG. 1) regarding:

how many track burns are left based on such particular license 16. In particular, if the license 16 specifies a maximum track burn value of 10, for example, the trusted component 18 upon receiving such license 16 creates in the state store 30 with regard to a license ID (LID) of such license 16 a track burns available count with a value set to 10, whereby such count is decremented each time the license 16 is employed to burn a track 12.

how many track burns per playlist 28 are available based on all licenses 16 for a track 12. In particular, if the license 16 specifies a maximum playlist burn value of 5, for example, the trusted component 18 upon receiving such license 16 creates in the state store 30 with regard to the TID of the corresponding track/content 12 a maximum playlist burn count with a value set to 5, whereby such count is only adjusted if another license 16 (the second license 16 of FIG. 3) is acquired that provides additional maximum playlist burns with regard to the track 12.

how many times the track 12 has been burned with regard to a particular playlist 28. In particular, for a particular track 12 that is about to be burned for a first time with regard to a particular playlist 28, the trusted component 18 creates in the state store 30 with regard to the TID of the track 12 and then the PID of the playlist 28 a track-playlist burned count with a value set to 0, whereby such count is incremented each time the track 12 is burned with regard to the particular playlist 28.

By maintaining such counts, and as shall be seen below, the trusted component 18 can ensure that both the maximum track burn value and the maximum playlist burn value of a license 16 are honored.

Thus, prior to burning any track 12 of the playlist 28 that was constructed as at step 401, and with regard to each track 12 in the playlist 28, the trusted component 18 reviews the license 16 corresponding to the track 12 and notes for example that the license 16 specifies a maximum track burn value of 10 and maximum playlist burn value of 5 (step 407). Thereafter, the trusted component 18 locates within the state store 30 the track burns available count with regard to the LID of the license 16, which was initially set to 10, the maximum playlist burn count with regard to the TID of the track 12, which was initially set to 5, and any track-playlist burned count with regard to the TID of the track 12 and the PID of the playlist 28 (step 409). Note here that if the track burns available count is zero (step 410), the process stops as the license 16 does not allow any more burns of the track (step 411). Note, too, that if no track-playlist burned count is found with regard to the TID of the track 12 and the PID of the playlist 28, such a track-playlist burned count is created and set to zero.

At any rate, and assuming that the track burns available count is greater than zero, the trusted component checks that the track-playlist burned count is less than the maximum playlist burn count (step 413). If so, the process may continue as the additional track-playlist burns are available for the particular track 12 for the particular playlist 28, at least with regard to the license 16 (step 414). If not, the process stops as no more such additional track-playlist burns are available (step 411). Alternatively, the process may in fact attempt to automatically acquire a new license with additional track-playlist burns.

Note also that rather than stopping the process as at step 411, it may instead be the case that the trusted component sets a no-burn flag, notes the reason for doing so in a no-burn log, and then continues until all tracks 12 of the playlist are processed as at steps 407-414. Thereafter, the trusted component 18 checks to see if the no-burn flag is set (step 415). If so, the trusted component 18 does not proceed but instead reports out the no-burn log (step 417). Thus, a user may review the reported no-burn log and possibly correct whatever problem may exist, perhaps by acquisition of one or more appropriate licenses 16.

However, if the no-burn flag is not in fact set, the trusted component 18 continues by in fact burning each track 12 of the playlist 28 to the portable medium 24 (step 419). Significantly, in doing so, and with regard to each track 12 of the playlist 28, the trusted component decrements the track burns available count with regard to the LID of the license 16 for the track 12, and increments the track-playlist burned count with regard to the TID of the track 12 and the PID of the playlist 28 (step 421). Accordingly, such values are accurate and available should the same track 12 be again burned as part of the same playlist 28.

For example, and as seen in FIG. 5, in the above scenario, the trusted component decrements the track burns available count with regard to the LID of the license 16 for the track 12 from 10 to 9, and increments the track-playlist burned count with regard to the TID of the track 12 and the PID of the playlist 28 from 0 to 1 as at step 421. Notably, if the same playlist 28 is burned 4 more times, such track burns available count would decrease to 5, and such track-playlist burned count would increase to 5. However, if an attempt is made to burn the same playlist 28 one additional time, such attempt would fail because the trusted component at step 413 would discover that the track-playlist burned count at 5 is not less than the maximum playlist burn count of 5.

Thus, the user is permitted no more burns of the playlist 28 with the track 12 based on the original license 16. However, and significantly, if the user purchases an additional license 16 (the second license 16 of FIG. 3) that also specifies a maximum playlist burn value, say of 4 more, the trusted component 18 upon receiving such additional license 16 increments the maximum playlist burn count in the state store 30 with regard to the TID of the corresponding track/content 12 by 4 from 5 to 9. Accordingly, a retry of the attempt to burn the same playlist 28 one additional time should succeed because the trusted component at step 413 would discover that the track-playlist burned count at 5 is now less than the maximum playlist burn count of 9.

CONCLUSION

The present invention may be practiced with regard to any appropriate computing device 14 and application 26 and trusted component 18 thereon attempting to burn a playlist 28 to a portable medium 24, where the playlist 28 includes at least one track 12 representative of RM-protected content 12 to be burned onto the portable medium 24 in an unencrypted form. Significantly, the present invention honors the terms of a license 16 corresponding to the track 12 with regard to any maximum playlist burn count set forth therein, among other things.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism by which the tracks 12 of a playlist 28 are burned on a collective basis. The trusted component 18 determines that all of the RM-protected tracks 12 of the playlist 28 can in fact be burned according to respective licenses 16 thereof prior to in fact burning any of such tracks 12. Thus, the trusted component 18 does not in fact commit changes to values associated with the burn of the playlist 28 until such trusted component 18 determines that all of the RM-protected tracks 12 of the playlist can in fact be burned.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method for a computing device to burn a playlist of tracks to a portable medium, each track corresponding to a piece of digital content, at least one of the pieces of content being rights-management (RM) protected and accordingly being burned to the portable medium only in accordance with a corresponding digital license, the method comprising:

the computing device constructing the playlist to include an identification of each track therein;

for each track corresponding to a piece of RM-protected content:

the computing device retrieving a license corresponding thereto, the license including a maximum track burn value and a maximum playlist burn value, the maximum track burn value in the license setting forth a maximum number of times the license may be employed to burn the corresponding piece of content as a track to a portable medium, the maximum playlist burn value setting forth a maximum number of times the license may be employed to burn the corresponding piece of content as a track within a particular playlist;

the computing device retrieving state information from a state store of the computing device, the state information including a track burns available count regarding how many track burns are left based on the license, a maximum playlist burn count regarding how many track burns per playlist are available based on all available licenses for the track, and a track-playlist burned count regarding how many times the track has been burned with regard to the playlist;

the computing device ensuring that the tracks of the playlist are burned collectively by performing a no-burn action before burning any tracks of the play list when the track-playlist burn count is greater than or equal to the maximum playlist burn count;

the computing device ensuring that the tracks of the playlist are burned collectively by performing a no-burn action before burning any tracks of the play list when the track burns available count is zero;

the computing device continuing to process the remaining tracks of the playlist;

the computing device determining, after all tracks of the playlist corresponding to a piece of RM-protected content have been processed, whether the no-burn action has been performed; and when the no-burn action has not been performed:

the computing device burning each track of the playlist to the portable medium; and for each track of the playlist corresponding to a piece of RM-protected content:

the computing device decrementing the track burns available count in the state store for the license corresponding to the track; and the computing device incrementing the track-playlist burned count in the state store with regard to the track and the playlist, whereby such value is accurate and available should the track be again burned as part of the playlist.

2. The method of claim 1 comprising:

the computing device constructing the playlist to include an identification (TID) of each track therein;

the computing device constructing an identification (PID) of the playlist from the TIDs of the tracks of the playlist;

for each track corresponding to a piece of RM-protected content:

the computing device retrieving a license corresponding thereto, the license having an identification (LID);

the computing device retrieving state information from a state store of the computing device, the state information including a track burns available count stored according to the LID of the license;

a maximum play list burn count stored according to the TID of the track; and a track-playlist burned count stored according to the TID of the track and the PID of the playlist.

3. The method of claim 2 wherein the computing device constructing the PID of the playlist comprises ordering the TIDS of the tracks of the playlist in, concatenating the ordered TIDs, and hashing the concatenated TIDs by way of a hashing algorithm to form the PID.

4. The method of claim 1 comprising the computing device constructing the playlist by receiving selections of the tracks thereof from a user of the computing device.

5. The method of claim 1 wherein the computing device performing the no-burn action comprises halting and not taking any further action to burn the playlist.

6. The method of claim 1 wherein the computing device performing the no-burn action comprises setting a no-burn flag, noting the no-burn flag and a reason for a no-burn event in a no-burn log, and continuing.

7. The method of claim 6 further comprising, after all tracks of the playlist corresponding to a piece of RM-protected content have been processed, and if the no-burn action has been performed, the computing device reporting out the no-burn log for review by a user of the computing device.

8. The method of claim 1 wherein the maximum playlist burn count comprises a sum of the maximum playlist burn values from all of the available licenses for the track.

9. The method of claim 1 wherein the computing device burns a playlist of unencrypted tracks to the portable medium, the method comprising burning each unencrypted track of the playlist to the portable medium.

10. A computer-readable medium having stored thereon computer-executable instructions implementing a method for a computing device to burn a playlist of tracks to a portable medium, each track corresponding to a piece of digital content, at least one of the pieces of content being rights-management (RM) protected and accordingly being burned to the portable medium only in accordance with a corresponding digital license, the method comprising:

constructing the playlist to include an identification of each track therein;

for each track corresponding to a piece of RM-protected content:

retrieving a license corresponding thereto, the license including a maximum track burn value and a maximum playlist burn value, the maximum track burn value in the license setting forth a maximum number of times the license may be employed to burn the corresponding piece of content as a track to a portable medium, the maximum playlist burn value setting forth a maximum number of times the license may be employed to burn the corresponding piece of content as a track within a particular playlist;

retrieving state information from a state store of the computing device, the state information including a track burns available count regarding how many track burns are left based on the license, a maximum playlist burn count regarding how many track burns per playlist are available based on all available licenses for the track, and a track-playlist burned count regarding how many times the track has been burned with regard to the playlist;

the computing device ensuring that the tracks of the playlist are burned collectively by performing a no-burn action before burning any tracks of the play list when the track-playlist burn count is greater than or equal to the maximum playlist burn count;

the computing device ensuring that the tracks of the playlist are burned collectively by performing a no-burn action before burning any tracks of the play list when the track burns available count is zero;

continuing to process the remaining tracks of the playlist;

determining, after all tracks of the playlist corresponding to a piece of RM-protected content have been processed, whether the no-burn action has been performed; and when the no-burn action has not been performed:

burning each track of the playlist to the portable medium; and for each track of the playlist corresponding to a piece of RM-protected content:

decrementing the track burns available count in the state store for the license corresponding to the track; and incrementing the track-playlist burned count in the state store with regard to the track and the playlist, whereby such value is accurate and available should the track be again burned as part of the playlist.

11. The medium of claim 10 wherein the method comprises:

constructing the playlist to include an identification (TID) of each track therein;

constructing an identification (PID) the playlist from the TIDs of the tracks of the playlist;

for each track corresponding to a piece of RM-protected content:

retrieving a license corresponding thereto, the license having an identification (LID);

retrieving state information from a state store of the computing device, the state store including:

a track burns available count stored according to the LID of the license;

a maximum playlist burn count stored according to the TID of the track; and a track-playlist burned count stored according to the TID of the track and the PID of the playlist.

12. The medium of claim 11 wherein constructing the PID of the playlist comprises ordering the TIDS of the tracks of the playlist, concatenating the ordered TIDs, and hashing the concatenated TIDs by way of a hashing algorithm to form the PID.

13. The medium of claim 10 wherein the method comprises constructing the playlist by receiving selections of the tracks thereof from a user of the computing device.

14. The medium of claim 10 wherein performing the no-burn action comprises halting and not taking any further action to burn the playlist.

15. The medium of claim 10 wherein performing the no-burn action comprises setting a no-burn flag, noting the no-burn flag and a reason for in a no-burn log, and continuing.

16. The medium of claim 15 wherein the method further comprises, after all tracks of the playlist corresponding to a piece of RM-protected content have been processed, and if the no-burn action has been performed, reporting out the no-burn log for review by a user of the computing device.

17. The medium of claim 10 wherein the maximum playlist burn count comprises sum of the maximum playlist burn values from all of the available licenses for the track.

18. The medium of claim 10 wherein the computing device burns a playlist of unencrypted tracks to the portable medium, the method comprising burning each unencrypted track of the playlist to the portable medium.

19. A computing device for burning a playlist of tracks to a portable medium, each track corresponding to a piece of digital content, at least one of the pieces of content being rights-management (RM) protected and accordingly being burned to the portable medium only in accordance with a corresponding digital license, the computing device comprising:

a memory; and a processor executing computer-executable instructions for implementing a method comprising:

constructing the playlist to include an identification of each track therein;

for each track corresponding to a piece of RM-protected content:

retrieving a license corresponding thereto, the license including a maximum track burn value and a maximum playlist burn value, the maximum track burn value in the license setting forth a maximum number of times the license may be employed to burn the corresponding piece of content as a track to a portable medium, the maximum playlist burn value setting forth a maximum number of times the license may be employed to burn the corresponding piece of content as a track within a particular playlist;

retrieving state information from a state store of the computing device, the state information including a track burns available count regarding how many track burns are left based on the license, a maximum playlist burn count regarding how many track burns per playlist are available based on all available licenses for the track, and a track-playlist burned count regarding how many times the track has been burned with regard to the playlist;

the computing device ensuring that the tracks of the playlist are burned collectively by performing a no-burn action before burning any tracks of the play list when the track-playlist burn count is greater than or equal to the maximum playlist burn count;

the computing device ensuring that the tracks of the playlist are burned collectively by performing a no-burn action before burning any tracks of the play list when the track burns available count is zero;

continuing to process the remaining tracks of the playlist;

determining, after all tracks of the playlist corresponding to a piece of RM-protected content have been processed, whether the no-burn action has been performed; and when the no-burn action has not been performed:

burning each track of the playlist to the portable medium; and for each track of the playlist corresponding to a piece of RM-protected content:

decrementing the track burns available count in the state store for the license corresponding to the track; and incrementing the track-playlist burned count in the state store with regard to the track and the playlist, whereby such value is accurate and available should the track be again burned as part of the playlist.

\* \* \* \* \*